(12) United States Patent
Schnitzer et al.

(10) Patent No.: US 11,493,603 B2
(45) Date of Patent: Nov. 8, 2022

(54) LIDAR SENSOR FOR DETECTING AN OBJECT

(71) Applicant: Robert Bosch GmbH, Stuttgart (DE)

(72) Inventors: Reiner Schnitzer, Reutlingen (DE);
Siegwart Bogatscher, Leonberg (DE);
Jan Sparbert, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 759 days.

(21) Appl. No.: 16/480,534

(22) PCT Filed: Feb. 7, 2018

(86) PCT No.: PCT/EP2018/053000
§ 371 (c)(1),
(2) Date: Jul. 24, 2019

(87) PCT Pub. No.: WO2018/149704
PCT Pub. Date: Aug. 23, 2018

(65) Prior Publication Data
US 2019/0383909 A1    Dec. 19, 2019

(30) Foreign Application Priority Data

Feb. 20, 2017   (DE) .......................... 102017202634.0

(51) Int. Cl.
*H04B 10/00* (2013.01)
*G01S 7/481* (2006.01)
(Continued)

(52) U.S. Cl.
CPC .......... *G01S 7/4812* (2013.01); *G01S 7/4817* (2013.01); *G01S 17/42* (2013.01); *G01S 17/00* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 7,880,865 B2 *  2/2011  Tanaka ................... G02B 26/12
                                                            356/5.15
10,571,574 B1 *  2/2020  Yavid ...................... G01S 17/89
(Continued)

FOREIGN PATENT DOCUMENTS

DE          19752888 A1    6/1999
DE       102008055159 A1    7/2010
(Continued)

OTHER PUBLICATIONS

International Search Report dated May 23, 2018 of the corresponding International Application PCT/EP2018/053000 filed Feb. 7, 2018.

*Primary Examiner* — Hanh Phan
(74) *Attorney, Agent, or Firm* — Norton Rose Fulbright US LLP; Gerard Messina

(57) ABSTRACT

A LIDAR sensor for detecting an object in the surroundings and a method of the LIDAR sensor includes a light source emitting electromagnetic radiation, a micromechanical deflection mirror deflecting the emitted electromagnetic radiation by at least one angle into the surroundings, and a mirror, which includes an aperture situated on a main beam axis of the light source, deflecting onto an optical receiver received electromagnetic radiation that has been reflected from the object.

10 Claims, 1 Drawing Sheet

(51) Int. Cl.
*G01S 17/42* (2006.01)
*G01S 17/00* (2020.01)

(58) Field of Classification Search
CPC ... H04B 10/1149; G01S 7/4817; G01S 17/42; G01S 17/4812; G01S 17/10; G01S 17/08; G01S 17/89; G01S 7/4816; G01S 7/4865; G01S 7/484; G01S 7/4812
USPC ....... 398/169, 170, 118, 119, 127, 128, 129, 398/130, 131, 135, 136, 158, 159; 356/4.01, 5.01, 3.01, 4.1
See application file for complete search history.

(56) References Cited

U.S. PATENT DOCUMENTS

| | | | |
|---|---|---|---|
| 2013/0107016 A1* | 5/2013 | Federspiel | G01S 17/89 348/49 |
| 2016/0033626 A1 | 2/2016 | Hirai et al. | |
| 2016/0146927 A1 | 5/2016 | Hudman | |
| 2016/0209510 A1* | 7/2016 | Sakabe | G01S 17/42 |
| 2021/0223369 A1* | 7/2021 | Lee | G02B 3/00 |

FOREIGN PATENT DOCUMENTS

| | | |
|---|---|---|
| DE | 112011101667 | 5/2013 |
| JP | 2008256465 A | 10/2008 |
| JP | 2013125165 A | 6/2013 |
| JP | 2017010005 A | 1/2017 |
| WO | 2011/144454 | 11/2011 |

* cited by examiner

LIDAR SENSOR FOR DETECTING AN OBJECT

CROSS-REFERENCE TO RELATED APPLICATIONS

The present application is the national stage of International Pat. App. No. PCT/EP2018/053000 filed Feb. 7, 2018, and claims priority under 35 U.S.C. § 119 to DE 10 2017 202 634.0, filed in the Federal Republic of Germany on Feb. 20, 2017, the content of each of which are incorporated herein by reference in their entireties.

FIELD OF THE INVENTION

The present invention relates to a LIDAR sensor and a method for controlling a LIDAR sensor.

BACKGROUND

Various sensor devices are known from the related art that allow detection of objects within a scanning space in the surroundings, for example of a vehicle. These include light detection and ranging (LIDAR) sensors with which the surroundings of the vehicle are scanned. The electromagnetic radiation emitted by a LIDAR sensor is reflected or backscattered from objects in the surroundings and received by an optical receiver of the LIDAR sensor. The position and the distance of objects in the surroundings can be determined based on this received radiation.

A device for recording the geometry of the surroundings of the device in a detection field using laser scanning with a laser beam that is deflected by an oscillating micromechanical mirror, is known from DE 102008055159 A1. The detection field is specifiable in the vertical and horizontal directions by adapting the oscillation amplitude and/or oscillation frequency of the micromechanical mirror.

To mount LIDAR sensors in or on certain areas of a vehicle in a space-saving manner, LIDAR sensors having a smaller installation volume or a lower installation height than approaches known thus far would be advantageous. In addition, there is a need for mechanically robust LIDAR sensors, in particular for use in vehicles.

SUMMARY

The present invention is directed to a LIDAR sensor for detecting an object in the surroundings, including at least one light source for emitting electromagnetic radiation, a deflection mirror for deflecting the emitted electromagnetic radiation by at least one angle into the surroundings, an optical receiver for receiving electromagnetic radiation that has been reflected from the object, and a mirror for deflecting the received electromagnetic radiation onto the optical receiver. The mirror includes an aperture, the aperture being situated on a main beam axis of the light source.

According to the present invention, the deflection mirror is designed as a micromechanical deflection mirror.

The deflection mirror can be designed as an oscillating micromechanical deflection mirror. The deflection mirror can also be designed as a static micromechanical deflection mirror.

The mirror can be situated between the light source and the deflection mirror in the beam path of the emitted electromagnetic radiation. The mirror can be situated between the deflection mirror and the optical receiver in the beam path of the received electromagnetic radiation.

The deflection mirror can be oscillatingly moved along an axis. The deflection mirror can also be statically moved along an axis. In these cases, this involves a one-dimensional deflection mirror. Alternatively, the deflection mirror can be oscillatingly moved along two axes. Alternatively, the deflection mirror can also be statically moved along two axes. In these cases, this involves a two-dimensional deflection mirror.

An advantage of the present invention is that a LIDAR sensor with a small installation volume, in particular a low installation height, can be implemented. The emitted electromagnetic radiation that strikes the deflection mirror as well as the received electromagnetic radiation that strikes the deflection mirror can have a small beam diameter. A compact deflection mirror with a correspondingly high sampling frequency can thus be used. A LIDAR sensor can be implemented that is sufficiently mechanically robust. By use of the mirror with the aperture, the beam path of the emitted electromagnetic radiation and the beam path of the received electromagnetic radiation can extend coaxially with respect to each other. Optical losses in the beam path of the emitted and the received electromagnetic radiation can be largely avoided. In particular the received electromagnetic radiation can be deflected onto the optical receiver largely free of loss. The LIDAR sensor can include an optical receiver that has sufficient size and sufficient sensitivity.

In an example embodiment of the present invention, it is provided that the electromagnetic radiation emitted by the light source along the main beam axis is deflected by the deflection mirror by the at least one angle as deflected emitted electromagnetic radiation into the surroundings, the at least one angle being a function of the orientation of the deflection mirror.

In another example embodiment of the present invention, the LIDAR sensor also includes a field of micro-optical elements. The deflection mirror and the field are situated in such a way that the at least one angle is associated precisely with one micro-optical element. Multiple angles of various magnitudes can be associated with each element.

In an example embodiment of the present invention, the LIDAR sensor also includes a light-bundling element that is situated at a distance from the field of micro-optical elements. Each of the micro-optical elements, when it is struck by the deflected emitted electromagnetic radiation, widens this deflected emitted electromagnetic radiation into a divergent beam. The light-bundling element re-forms the divergent beam into a scanning beam. An advantage of this embodiment is that eye safety can be ensured, even at a higher total output of the emitted electromagnetic radiation. The beam diameter of the scanning beam can be larger than the pupil diameter of the human eye. The sensitivity to scattered particles can be kept low.

It is not the emitted electromagnetic radiation that is deflected at the deflection mirror that directly scans the surroundings, but, rather, the field of micro-optical elements. The direction in which the scanning beam is emitted is a function of the position of the micro-optical element in question relative to the optical axis of the light-bundling element. The opening angle of the LIDAR sensor can therefore be considerably larger than the angle by which the electromagnetic radiation is maximally deflected at the deflection mirror. This allows scanning with a wide opening angle.

In an example embodiment of the present invention, the micro-optical elements are microlenses or reflective or light-diffracting elements.

The bundling element can be an optical lens in whose focal plane the field of micro-optical elements is situated. The divergent beam is thus re-formed into a scanning beam in which the rays are virtually in parallel. Alternatively, a concave mirror would also be conceivable instead of a lens.

In an example embodiment of the present invention, the light-bundling element at the same time forms a lens of the optical receiver. In this way, the received electromagnetic radiation can be coaxial with the emitted electromagnetic radiation. It is thus not necessary to take paradox errors into account in the evaluation of the received electromagnetic radiation. The received electromagnetic radiation can be deflected onto the optical receiver using the mirror that is situated between the deflection mirror and the optical receiver in the beam path of the received electromagnetic radiation.

In an example embodiment of the present invention, a mirror unit that deflects the deflected emitted electromagnetic radiation onto the field of micro-optical elements is situated on the optical axis of the light-bundling element. Received electromagnetic radiation can likewise be deflected onto the deflection mirror using the mirror unit. An advantage of this embodiment is that the beam path of the LIDAR sensor can be adapted.

In an example embodiment of the present invention, the mirror unit has a curved design. An advantage of this embodiment is that imaging errors can be compensated for.

In an example embodiment of the present invention, the optical receiver includes two or more detector elements arranged in a linear manner or as a matrix. An advantage of this embodiment is that plausibility checking of a measured distance from an object that is detected in the surroundings can be carried out based on the position and the power of the received electromagnetic radiation. This option results from the fact that the deflection mirror effectuates a shift in the received electromagnetic radiation corresponding to the propagation time of the electromagnetic radiation.

An example embodiment of the present invention is directed to a method for controlling a LIDAR sensor for detecting an object in the surroundings is claimed. The method includes the following steps: controlling a light source for emitting electromagnetic radiation through an aperture of a mirror, controlling a micromechanical deflection mirror for deflecting the emitted electromagnetic radiation by at least one angle into the surroundings, and receiving electromagnetic radiation, which has been reflected from the object, using an optical receiver.

In an example embodiment of the present invention, the control of the deflection mirror takes place in such a way that the emitted electromagnetic radiation that is deflected by the at least one angle strikes one micro-optical element of a field. Two example embodiments of the present invention are explained in greater detail below with reference to the appended drawings.

DETAILED DESCRIPTION

Figure 1:
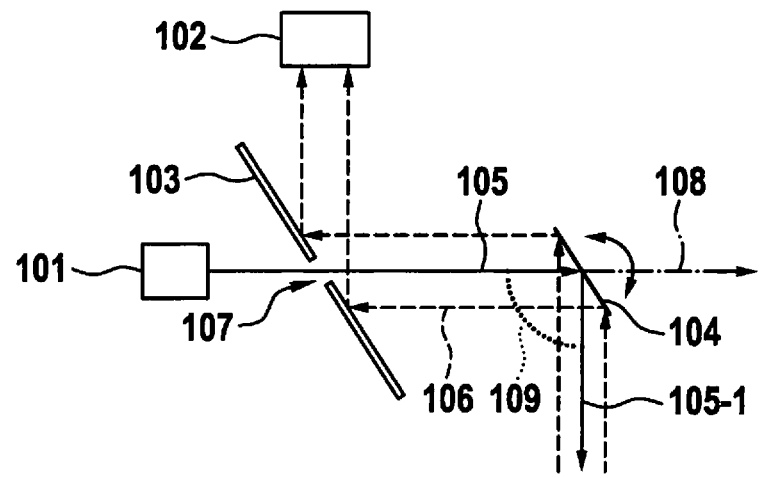
FIG. 1 is a diagram of a LIDAR sensor according to an example embodiment of the present invention.

The LIDAR sensor shown in FIG. 1 includes a laser as a light source 101, which emits electromagnetic radiation 105 in the visible range of the spectrum, or optionally also in the infrared range. The LIDAR sensor also includes mirror 103. Mirror 103 includes aperture 107 in the center of its mirror surface. Mirror 103 is situated between light source 101 and deflection mirror 104 of the LIDAR sensor. Mirror 103 is arranged in such a way that aperture 107 is situated on main beam axis 108 of light source 101. Electromagnetic radiation 105 emitted by light source 101 along main beam axis 108 is directed through aperture 107 and onto deflection mirror 104 free of loss to the greatest extent possible.

Deflection mirror 104 is a micromechanical deflection mirror. As indicated by the double arrow, deflection mirror 104 is oscillatingly or statically moved along an axis. It is also possible for deflection mirror 104 to be oscillatingly or statically moved about a second axis that extends at a right angle to the first axis. Deflection mirror 104 deflects emitted electromagnetic radiation 105 as deflected emitted electromagnetic radiation 105-1 into the surroundings. The control of deflection mirror 104 takes place in such a way that in a first orientation, emitted electromagnetic radiation 105 is deflected by at least one angle as deflected emitted electromagnetic radiation 105-1 into the surroundings. This one angle 109 is indicated in FIG. 1. In a second orientation of the deflection mirror, emitted electromagnetic radiation 105 can be deflected by at least one further angle, different from the first angle, as deflected emitted electromagnetic radiation 105-1 into the surroundings.

When deflected emitted electromagnetic radiation 105-1 in the surroundings strikes an object, the electromagnetic radiation is reflected and/or backscattered from the object. Reflected and/or backscattered electromagnetic radiation 106 is received by the LIDAR sensor. Electromagnetic radiation 106 strikes optical receiver 102 via deflection mirror 104 and mirror 103 described above. Mirror 103 is situated between deflection mirror 104 and optical receiver 102 along the beam path of the received electromagnetic radiation. Optical receiver 102 includes detector elements that are arranged in a linear manner or as a matrix, for example.

Figure 2:
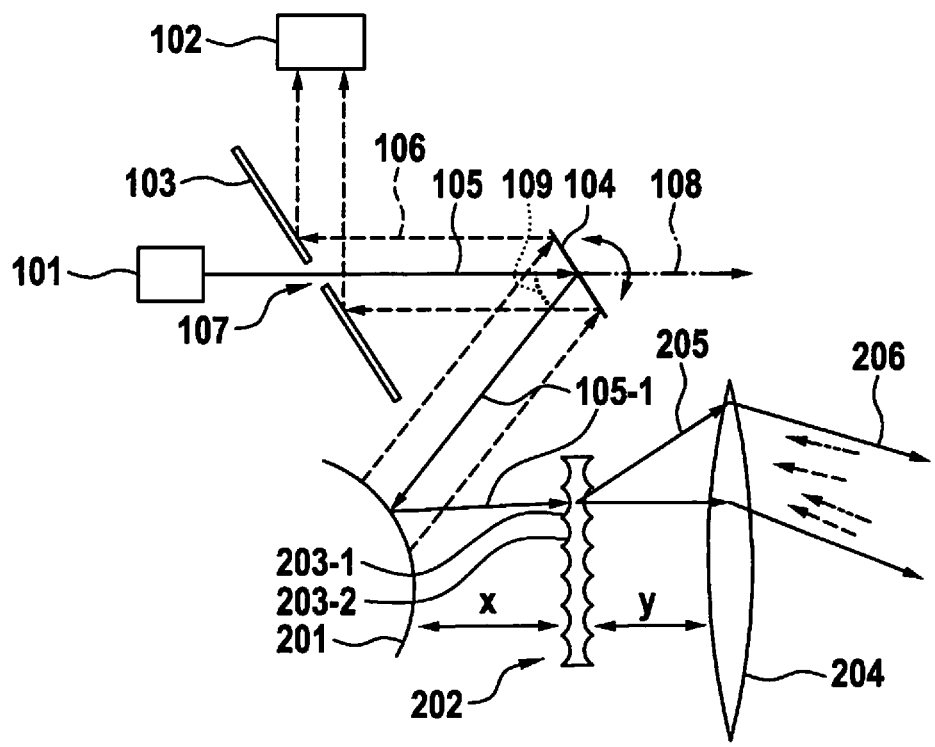
FIG. 2 shows a diagram of a LIDAR sensor according to an example embodiment of the present invention.

FIG. 2 shows a LIDAR sensor according to another example embodiment. In this LIDAR sensor, emitted electromagnetic radiation 105 that is directed from light source 101 along main beam axis 108, and through aperture 107 and onto deflection mirror 104 of the LIDAR sensor free of loss to the greatest extent possible, is guided as deflected emitted electromagnetic radiation 105-1 onto a field 202 of micro-optical elements 203 using deflection mirror 104. In this example, light-diffracting elements 203 are provided as micro-optical elements. However, light-refracting or light-reflecting elements can also optionally be provided.

The at least one angle, by which emitted electromagnetic radiation 105 is deflected as deflected emitted electromagnetic radiation 105-1, is associated precisely with one micro-optical element 203-1, 203-2. Angle 109 depicted in FIG. 2 is associated with micro-optical element 203-1. Multiple angles of various magnitudes can be associated with each element 203. If, for example, emitted electromagnetic radiation 105 is deflected by deflection mirror 104 by an angle that differs slightly from angle 109, deflected emitted electromagnetic radiation 105-1 likewise strikes micro-optical element 203-1. If the difference between angle 109 and a further deflection angle exceeds a predefined value, deflected emitted electromagnetic radiation 105-1 strikes adjacent micro-optical element 203-2, for example.

The particular one of light-diffracting elements 203 that is struck by deflected electromagnetic radiation 105-1 widens deflected emitted electromagnetic radiation 105-1 into a divergent beam 205, which strikes a light-bundling element in the form of a lens 204. Distance y between field 202 and lens 204 approximately corresponds to the focal length of lens 204. Lens 204 re-forms divergent beam 205 into an approximately parallel scanning beam 206. The beam diameter of scanning beam 206 is larger than the beam diameter of the beam of emitted electromagnetic radiation 105. The beam diameter of scanning beam 206 is larger than the beam diameter of the beam of deflected emitted electromagnetic radiation 105-1.

The radiation direction of scanning beam 206 is a function of the position of micro-optical element 203 in relation to the optical axis of light-bundling element 204 that is struck by deflected emitted electromagnetic radiation 105-1 at that moment. In this way, deflection mirror 104 also directly effectuates a deflection of scanning beam 206. Scanning beam 206 sweeps the surroundings of the LIDAR sensor. The angular range that is swept by scanning beam 206 is a function of the focal length of lens 204. The angular range can be considerably greater than twice the angular range in which deflection mirror 104 is moved.

A further mirror unit 201 is provided between deflection mirror 104 and field 202. Mirror unit 201 is situated at a distance x from field 202. This further mirror unit 201 is designed as a curved mirror to compensate for imaging errors. Mirror unit 201 deflects electromagnetic radiation 105 that is deflected from deflection mirror 104 in such a way that it strikes field 202 along the optical axis of lens 204.

What is claimed is:

1. A LIDAR sensor comprising:
a light source;
a micro mechanical emission deflection mirror;
an optical receiver;
a reception deflection mirror;
a field of micro-optical elements arranged such that the at least one angle is associated precisely with one of the micro-optical elements;
a light-bundler, wherein each of the micro-optical elements, when it is struck by the deflected emitted electromagnetic radiation, is configured to widen the deflected emitted electromagnetic radiation into a divergent beam, wherein the light-bundler is configured to re-form the divergent beam into a scanning beam; and
a mirror situated on an optical axis of the light-bundler to deflect the deflected emitted electromagnetic radiation onto the field of micro-optical elements;
wherein the light source is configured to emit electromagnetic radiation,
wherein the emission deflection mirror is configured to deflect the emitted electromagnetic radiation by at least one angle into surroundings; and
wherein the reception deflection mirror includes an aperture situated on a main beam axis of the light source, and is configured to deflect onto the optical receiver electromagnetic radiation that has been reflected from an object in the surroundings, for detecting the object.

2. The LIDAR sensor of claim 1, wherein the light source is configured to emit the electromagnetic radiation along the main beam axis, and the at least one angle is a function of an orientation of the deflection mirror.

3. The LIDAR sensor of claim 1, wherein the mirror is curved.

4. The LIDAR sensor of claim 1, wherein the micro-optical elements include microlenses, reflective elements, or light-diffracting elements.

5. The LIDAR sensor of claim 1, wherein the optical receiver includes two or more detector elements arranged in a linear manner or as a matrix.

6. A LIDAR sensor comprising:
a light source;
a micro mechanical emission deflection mirror;
an optical receiver;
a reception deflection mirror; and
a field of micro-optical elements arranged such that the at least one angle is associated precisely with one of the micro-optical elements;
wherein the light source is configured to emit electromagnetic radiation,
wherein the emission deflection mirror is configured to deflect the emitted electromagnetic radiation by at least one angle into surroundings; and
wherein the reception deflection mirror includes an aperture situated on a main beam axis of the light source, and is configured to deflect onto the optical receiver electromagnetic radiation that has been reflected from an object in the surroundings, for detecting the object, wherein:
the optical receiver includes a lens;
each of the micro-optical elements, when it is struck by the deflected emitted electromagnetic radiation, is configured to widen the deflected emitted electromagnetic radiation into a divergent beam; and
the lens is configured to re-form the divergent beam into a scanning beam.

7. The LIDAR sensor of claim 6, further comprising:
a mirror situated on an optical axis of the lens to deflect the deflected emitted electromagnetic radiation onto the field of micro-optical elements.

8. The LIDAR sensor of claim 7, wherein the mirror is curved.

9. A method for a LIDAR sensor for detecting an object in surroundings, the method comprising:
a light source to emit electromagnetic radiation through an aperture of a mirror;
a micromechanical emission deflection mirror to deflect the emitted electromagnetic radiation by at least one angle into the surroundings; and
an optical receiver to receive electromagnetic radiation that has been reflected from the object;
wherein the LIDAR sensor includes the light source, the micro mechanical emission deflection mirror, the optical receiver, and a reception deflection mirror, and further includes:
a field of micro-optical elements arranged such that the at least one angle is associated precisely with one of the micro-optical elements, a light-bundler, wherein each of the micro-optical elements, when it is struck by the deflected emitted electromagnetic radiation, is configured to widen the deflected emitted electromagnetic radiation into a divergent beam, wherein the light-bundler is configured to re-form the divergent beam into a scanning beam; and
a mirror situated on an optical axis of the light-bundler to deflect the deflected emitted electromagnetic radiation onto the field of micro-optical elements;
wherein the light source is configured to emit electromagnetic radiation,
wherein the emission deflection mirror is configured to deflect the emitted electromagnetic radiation by at least one angle into surroundings, and
wherein the reception deflection mirror includes an aperture situated on a main beam axis of the light source, and is configured to deflect onto the optical receiver electromagnetic radiation that has been reflected from an object in the surroundings, for detecting the object.

10. The method of claim 9, wherein the emitted electromagnetic radiation that is deflected by the at least one angle strikes precisely one micro-optical element of a field.

* * * * *